United States Patent [19]
Poulsen

[11] 3,736,792
[45] June 5, 1973

[54] APPARATUS AND METHOD FOR MONITORING AND RECORDING FUMIGANT CONCENTRATIONS IN CHAMBER FUMIGATION

[75] Inventor: Stephen D. Poulsen, Kingsburg, Calif.

[73] Assignee: Sun-Maid Raisin Growers, Kingsburg, Calif.

[22] Filed: July 16, 1971

[21] Appl. No.: 163,365

[52] U.S. Cl. ................... 73/27 R, 73/421.5, 73/432, 99/468, 99/475
[51] Int. Cl. ........ G01n 31/00, G01n 1/22, A23l 1/00
[58] Field of Search ...................... 73/19, 23, 27, 28, 73/73, 421 B, 422 R, 27 R, 421.5, 432; 340/237, 237 R; 99/258

[56] References Cited

UNITED STATES PATENTS

| | | | |
|---|---|---|---|
| 3,209,343 | 9/1965 | Dunham et al. | 340/237 R |
| 3,593,023 | 7/1971 | Dodson et al. | 73/23 X |
| 2,644,934 | 7/1953 | Grant | 340/237 S |
| 3,043,145 | 7/1962 | Hoffman | 73/421.5 R |
| 3,369,405 | 2/1968 | Gategar | 73/421 B |
| 2,122,853 | 7/1938 | Biggs | 99/258 |
| 3,474,660 | 10/1969 | Dooley | 73/27 R |

*Primary Examiner*—Richard C. Queisser
*Assistant Examiner*—Stephen A. Kreitman
*Attorney*—Boyken, Mohler, Foster & Schwab

[57] ABSTRACT

A system of monitoring the concentration of a gaseous fumigant within an enclosed chamber having the product or products to be fumigated, the monitoring being automatic in a predetermined order in different locations within said chamber in successive cycles for a predetermined period of time in each cycle. The degree of concentration is automatically graphically recorded during each of the successive periods of time within each cycle. The fumigant is withdrawn from said different locations through separate tubes within said chamber releasably connectible outside the chamber for separate couplings with a corresponding number of tubes that in turn connect with a single conduit for delivering the withdrawn air-fumigant mixture to a sensing device for measuring the fumigant concentration. The sensing device electrically transmits the degree of concentration to a recorder where it is graphically recorded. Control structure in the tubes between said couplings and said single conduit include valves respectively in said tubes automatically opened in succession for uniform periods of time to admit the air-fumigant mixture to said sensing device, and said structure includes a valve to automatically open said single conduit to air between cycles to clear the conduit for the next cycle.

7 Claims, 3 Drawing Figures

PATENTED JUN 5 1973 3,736,792
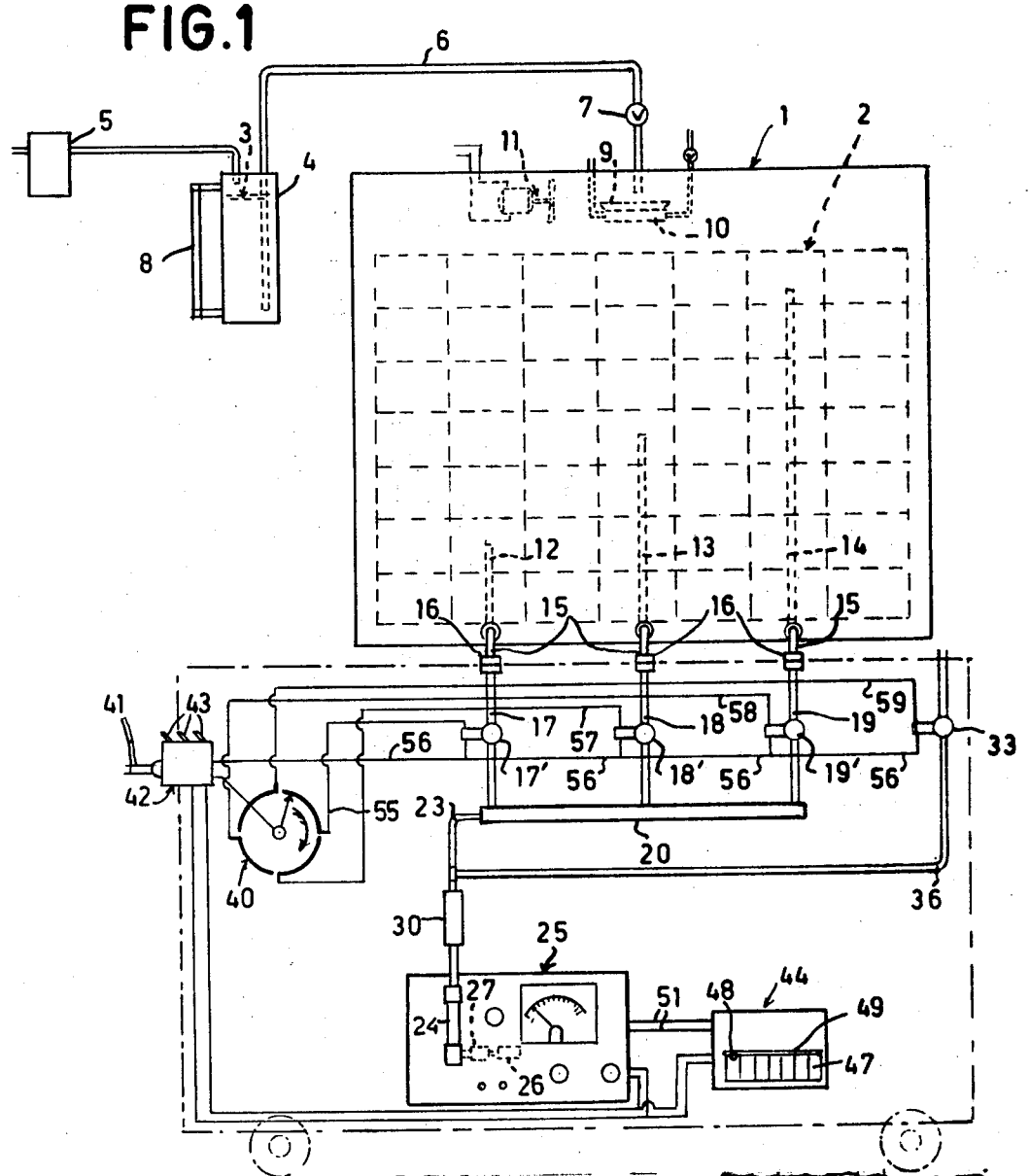
FIG.1
FIG.2
FIG.3
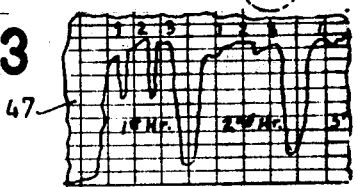
INVENTOR.
STEPHEN D. POULSEN
BY
Boylan, Mohler, Foster & Schwab
ATTORNEYS

APPARATUS AND METHOD FOR MONITORING AND RECORDING FUMIGANT CONCENTRATIONS IN CHAMBER FUMIGATION

BACKGROUND OF THE DISCLOSURE

Thermal conductivity devices to compare the thermal conductivity of a mixture of gaseous fumigant and dry air with that of pure dry air, and to convert the difference into an electric metering current are well known in industry. A relatively simple and inexpensive device known in the trade as a FUMISCOPE is used in the present instance. The use of the word FUMISCOPE herein is intended to include any of the thermal conductivity devices operating in a similar manner.

The overall fumigating time required for fumigating packaged raisins, as an example, may be 12 hours or more, depending on the character of the packages, the volume occupied by them, ratio of said volume to the chamber space, the fumigant, and many other considerations. In any event, the total fumigating time is such that periodic observations are required to insure effective fumigation and, as one example, approximately 1½ lbs. of methyl bromide in liquid form, for each 1,000 cubic feet of chamber volume filled with packaged raisins ordinarily requires approximately 12 hours.

Heretofore a FUMISCOPE has been separately set up and stabilized for each of the different locations within the fumigation chamber, and a specimen of the air-fumigant mixture would be withdrawn into the FUMISCOPE. The operator would make a relatively short observation of the meter and record the data. The duration of exposure for each location would vary, and the number of readings taken during the 12-hour period for all of the several different locations would also vary.

SUMMARY

Several of the objects of the present invention are: the provision of apparatus, and a method for obtaining repeated accurate readings during uniform periods of time within a predetermined overall time period, of the fumigant concentration at each of a plurality of different locations within a fumigation chamber containing the product being fumigated.

Another object of the invention includes the aforesaid objects, in which the air-fumigant mixture within the chamber is automatically withdrawn from each of the plurality of different locations and from the chamber, in succession, during each of said uniform time periods and a continuous reading during each such time period is automatically made and graphically recorded.

A still further object of the invention includes the foregoing objects with the provision for automatically stabilizing the system between each of the successive cycles of readings from the plurality of different locations to substantially eliminate any influence on readings in one cycle due to residual fumigant in the system from the preceding cycle.

An added object of the invention is the provision of a portable apparatus that includes a plurality of conduits, and couplings for connecting said conduits with tubes that extend to different locations within a stationary fumigation chamber, and which plurality of conduits connect with a single conduit that, in turn, delivers the air-fumigant mixture, in succession, from each of said different locations to a sensing device adapted to measure the degree of concentration of fumigant at each of said different locations when pumped to said sensing device, and a single pump in said single conduit is provided to so pump said air-fumigant mixture, and automatically actuated valves in each of said plurality of conduits have control means operatively connected therewith for automatically opening and closing said conduits in succession to pass a uniform amount of said mixture for uniform successive periods of time from each of said plurality of tubes to said sensing device, and a recorder is electrically connected with said sensing device for graphically recording the concentration of fumigant during each of said periods of time.

A still further object of the invention is the provision of a fumigation measuring system for more effectively and accurately determining the fumigant concentration at each of a plurality of different locations within a fumigation chamber having therein the products to be fumigated.

Other objects and advantages will appear in the description and drawings.

DESCRIPTION OF DRAWINGS

FIG. 1 is a schematic view of the fumigation system, the portable vehicle for the monitoring apparatus being indicated in dot-dash lines. Elements within the fumigation chamber and within the measuring device are indicated in broken lines.

FIG. 2 is a schematic simplified or abbreviated view of a portion of the electrical circuit.

FIG. 3 is a fragmentary view of the portion of the chart of the recorder for the first 2 hours of operation.

DESCRIPTION OF THE INVENTION

The fumigation chamber is generally designated 1, and the packaged products to be fumigated are designated 2. Normally, such chamber has a large loading door for lift truck entry and a standard door for personal entry, which doors are closed essentially air tight during fumigation. These are conventional so are not shown.

In the present example, where the fumigant is methyl bromide, the liquid methyl bromide 3 within a supply tank 4 is forced by air pressure from a source 5 through a line 6 into the upper portion of chamber 1.

A valve 7 in line 6 may control the flow of liquid methyl bromide into the chamber 1, and a graduated sight gauge 8 or other suitable means indicates the weight of the liquid discharged into the chamber. Where methyl bromide or other vaporizable liquid fumigants are used for which heat may be employed to expedite vaporization, it is preferable that the liquid fumigant be discharged into an open tray 9 having a false bottom 10 heated by hot water coils or other suitable means for boiling off the methyl bromide.

Heretofore a special nozzle in the discharge end of line 6 provided a spray and heated air from a circulating fan such as indicated at 11, was employed to expedite vaporization. The nozzle would clog at times, resulting in expensive maintenance costs. Also the vaporization of the discharged liquid by the heated air was dependent upon the effectivity of the discharge nozzle, and the fan. The present structure eliminates these objections.

Where methyl bromide, or any other fumigant similarly vaporizable from liquid form is used the fan 11 still may be used to both expedite vaporization and to circulate the gaseous fumigant. A valve in the hot water line to coils to bottom 11 controls the heat for vaporization during the vaporization period.

Extending to different locations within the chamber 1 are tubes 12, 13, 14. The air-fumigant mixture within the chamber is to be drawn into said tubes at each of said different locations for obtaining readings of the fumigant concentration at said locations, or levels.

The end portions 15 of tubes 12, 13, 14 opposite to the open ends of the tubes preferably extend through one of the side walls of the chamber 1 within easy reach of a person of normal height, and said end portions are provided with conventional structure quick releasable couplings 16 to connect and disconnect tubes 12, 13, 14 with flexible lengths 17, 18, 19 of hose 17, 18, 19.

Flexible hose lengths 17, 18, 19 may be relatively long to facilitate their manipulation in coupling with the tubes 12, 13, 14 and their ends opposite the couplings 16 connect with rigid extensions that, in turn, connect with a manifold 20. Solenoid actuated valves 17', 18' and 19' are respectively in said extensions for opening and closing the hoses and their extensions to flow of the air-fumigant mixture from tubes 12, 13, 14 to the manifold.

A flexible pipe 23 connects the manifold 20 with fitting 24 rigid on a conventional thermal conductivity device, or FUMISCOPE generally designated 25 for conducting the air-fumigant mixture from the manifold to the FUMISCOPE.

The thermal conductivity device 25 includes a conventional thermal conductivity detector diagrammatically indicated at 26 that compares the thermal conductivity of a dry air-fumigant with pure dry air in a corresponding thermal conductivity detector 26' (FIG. 2). The thermal conductivity difference is not only displayed on the meter but is also employed for recording the degree of concentration on a conventional servo-recorder, as will be explained. An electrically actuated pump, indicated at 27, is within the thermal conductivity device for pumping the air-fumigant mixture through pipe 23 and through the thermal conductivity cell 26, and conventional means such as a manually actuatable knob is provided for adjusting and controlling the flow rate of the mixture to a constant value regardless of the length or size of the conduit conducting the air-fumigant mixture from within the chamber 1 to and through the thermal conductivity detector.

A dehydrator 30 in pipe 23 removes moisture from the air-fumigant. The dehydrator 30 contains a conventional desiccant of a type that is non-absorptive of the fumigant, such as anhydrous calcium sulphate, distributed under the trade name of DRIERITE, and which is readily regenerated by application of suitable heat.

A fourth solenoid valve 33 is in a rigid extension of a flexible pipe 36, one end of which extension opens to the atmosphere, while the opposite end of the flexible pipe 36 is connected with the pipe 23 at a point between the manifold 20 and the dehydrator 30.

Any suitable timer-switch combination generally designated 40 is electrically driven by power from a main source of A.C. current 41 which may be connected with a switch box 42 having switches therein respectively actuated by manually actuatable elements 43 for driving the timer-switch combination for successively opening the valves 17, 18, 19 and 33, and for actuating pump 27, cell 26 and a conventional servo-recorder 44, which will later be explained.

The solenoid valves 17', 18', 19' and 33 are of the spring-closing type which automatically close when the solenoids are de-energized, and the timer-switch is of the multiple cycle type which will recycle actuation of the solenoid actuated valves for the desired number of cycles and then may be manually discontinued.

As indicated in the drawing, assuming each complete cycle of the timer-switch is for 1 hour, each of the four valves 17', 18', 19' and 33 will be open in that order, for a period of 15 minutes, and then closed until the next cycle.

In operation the thermal conductivity device 25 and the recorder 44 are initially connected in the electrical circuit by actuation of the appropriate switch to warm them, and the pan 9 in the chamber 1 is warmed by actuation of the valve to circulate heated water through the heater 10. The pump 27 is started and the usual adjustments made to bring the meter on the FUMISCOPE to zero as a pure air sample is drawn through the instrument.

The fumigant may be of a type that does not require the fan or heat vaporization, in which case the fan and the vaporizing means may be omitted, although in any event it is preferable that the system be adjusted to provide the zero reading before the fumigant is admitted into the chamber 1. However, where, for example, methyl bromide is used, the required amount is discharged into the heated pan 9 where it is vaporized, and fan 11 is started.

Recorder 44 is of the type that includes a motor-driven chart 47 (FIGS. 1, 3) and a pen 48 on a carriage 49 driven by a servo-motor 50 (FIG. 2) that is electrically connected with the meter-actuating circuit 51 in the thermal conductivity device 25 for effecting movement of the pen carriage responsive to variations in the air-fumigant concentration in the several different areas within the fumigation chamber 1 to graphically show such concentration as indicated by a line 50 (FIG. 3).

For example, the circuit 55, 56 will be closed during the initial 15-minute period of operation of the first hour's operation of timer 40 to open valve 17' to flow of air-fumigant from the lower portion of the fumigation chamber 1 at the end of which period the circuit will be broken and the valve 17' closed and immediately thereafter circuit 56, 57 will be closed and the solenoid of valve 18' will be energized, opening said valve and moving air from the central level of the chamber 1 through the detector 26, and during this second period the degree of concentration at said central level will be recorded on chart 47 after which valve 18' will be closed. Valve 19' will thereafter be opened as circuit 56, 58 is closed, to effect recording of the concentration in the upper portion of the fumigation chamber.

During the final 15-minute period, after valve 19' has closed, circuit 56, 59 will be closed and valve 33 will be opened to draw atmospheric air through the dehydrator 30 and the sensor tube 26 to again substantially stabilize the meter and recorder for the next hour's cycle.

In explanation of FIG. 2 the detector elements 26, 26' or heat sources, are organized in a Wheatstone bridge permitting the unbalance from change in sample or gas, or in the air-fumigant mixture in this instance, to be read on a meter and recorder 44. Current to the thermal conductivity device is rectified therein and conducted to the Wheatstone bridge from which the D.C. lines 51, as herein above described actuates the motor 50 that, in turn, actuates the pen 48 to graphically indicate the degree of concentration at the different levels in the fumigation chamber. The recorder in the present instance is what is known in the trade as HEATH SERVO RECORDER.

FIG. 3 is illustrative of a normal record for the first and second hour of operation. During the first hour the dips in the graph indicate the initial purging of air in the lines 17, 18 and the deep dip following the third quarter indicates the substantial stabilizing of the system for another recording of the air-fumigant concentrations at the upper levels of tubes 12, 13, 14.

I claim:

1. Apparatus for monitoring and recording the fumigant concentration within a closed chamber containing a gaseous air-fumigant mixture and the product to be fumigated comprising the combination of:
   a. a substantially airtight chamber containing air and a predetermined amount of gaseous fumigant, a plurality of tubes within said chamber having open terminal intake ends at different levels within said chamber and discharge ends outside said chamber,
   b. a thermal conductivity device separate from and outside said chamber including an electrically actuated thermal conductivity detector in an electrical circuit variably responsive to and in accordance with differences in the fumigant concentration in said air-fumigant mixture when said mixture is brought into contact therewith for indicating the degree of such concentration, and an electrically actuated recorder in said circuit-actuatable in accordance with variations in said circuit for graphically recording said concentration and variations thereof,
   c. a single conduit outside said chamber having an intake end and a discharge end, and connecting means for connecting the discharge ends of said tubes with said intake end of said conduit,
   d. said connecting means including timer-controlled valve means for automatically opening each tube to flow of the air-fumigant mixture therethrough to the intake end of said single conduit for a uniform period of time in a predetermined order in successive cycles and for automatically closing each tube to said flow at the end of each such period of time and holding it closed until opened and closed in the next cycle, and a timer operatively connected with said valve means for actuating the latter,
   e. continuously actuated mixture-moving means in said single conduit for moving the air-fumigant mixture from its inlet end to its discharge end at a uniform rate,
   f. said thermal conductivity device being within said single conduit in a position for continuous contact with the air fumigant mixture moved through said single conduit whereby the degree of fumigant concentration withdrawn from each of said levels will be graphically recorded by said recorder.

2. In apparatus as defined in claim 1;
   g. an air pipe having an open inlet end in communication with the atmosphere, and a discharge end in communication with said connecting means, and
   h. said timer controlled valve means including a valve in said pipe automatically actuated between each cycle of opening and closing of said tubes to flow of said air-fumigant mixture for automatically opening said pipe to movement of atmospheric air through said single conduit for a predetermined period of time to purge said conduit of the air fumigant mixture therein.

3. In apparatus as defined in claim 2;
   i. a desiccant dehydrator positioned within said single conduit between said connecting means and said thermal conductivity detector for dehydrating said atmospheric air during movement of the latter through said single conduit to said detector.

4. In apparatus as defined in claim 1;
   g. said connecting means including a manifold with which said single conduit is connected, and a plurality of flexible pipe lengths for connecting said manifold with said tubes,
   h. quick detachable coupling means on said flexible pipe lengths for detachably connecting them with the discharge ends of said tubes,
   i. portable means supporting said connecting means, single conduit, thermal conductivity device and recorder for movement as a unit to different fumigation chambers for connection therewith.

5. In apparatus as defined in claim 1:
   g. means for introducing said fumigant into said closed chamber.

6. In apparatus as defined in claim 5:
   h. said fumigant being a vaporizable liquid, and means within said chamber for receiving and supporting the liquid so introduced exposed to the air within said closed chamber; and
   i. means for vaporizing the liquid so supported and exposed.

7. The method of monitoring the fumigant concentration in an air-fumigant mixture within an enclosed essentially air-tight chamber containing air and the product to be fumigated, comprising the steps of:
   a. circulating a predetermined amount of a gaseous fumigant in air within said chamber to provide an air-fumigant mixture, and at the same time in a plurality of successive cycles;
   b. successively withdrawing from said chamber, in a predetermined order, and from each of a predetermined number of different levels within said chamber along separate, enclosed paths extending to points outside said chamber, a uniform amount of said air-fumigant mixture during a uniform period of time for each such withdrawal;
   c. moving each succession of the air-fumigant mixture so withdrawn along the same single enclosed path extending substantially from said points to a discharge location, and discharging it from said location;
   d. continuously measuring at a measuring station along said single path the degree of concentration of the fumigant in the air-fumigant mixture of each succession so moved along said single path to said location, and at the same time;
   e. continuously, permanently, graphically recording variations in the air-fumigant concentration by a force responsive for movement by and in accordance with said variations during said continuous movement of each succession of said air-fumigant mixture past said measuring station;
   f. closing each of said separate paths to withdrawal of said air-fumigant mixture outside said chamber at each of said points at the end of each withdrawal from each of said levels in each cycle, and purging only said single path between said measuring station and said points of said air-fumigant mixture to said points, and after each purging recommencing said cycle of withdrawals.

* * * * *